United States Patent [19]

Ninomiya

[11] Patent Number: 4,761,910
[45] Date of Patent: Aug. 9, 1988

[54] ARTIFICIAL BAIT DEVICE

[75] Inventor: Masaki Ninomiya, Chiba, Japan

[73] Assignee: Tackle House Co., Ltd., Tokyo, Japan

[21] Appl. No.: 78,865

[22] Filed: Jul. 28, 1987

[30] Foreign Application Priority Data

Jul. 28, 1986 [JP] Japan .......................... 61-115523[U]

[51] Int. Cl.⁴ ............................................. A01K 85/00
[52] U.S. Cl. ................................. 43/42.31; 43/42.22; 43/42.39
[58] Field of Search ................. 43/42.04, 42.15, 42.22, 43/42.31, 42.35, 42.39

[56] References Cited

U.S. PATENT DOCUMENTS

| 2,703,946 | 3/1955 | Davis | 43/42.22 |
|---|---|---|---|
| 2,878,611 | 3/1959 | Netherton et al. | 43/42.31 |
| 3,044,207 | 7/1962 | Dorsett | 43/42.31 |
| 4,079,539 | 3/1978 | Holstein | 43/42.22 |
| 4,155,191 | 5/1979 | Spivey | 43/42.39 |

Primary Examiner—Nicholas P. Godici
Assistant Examiner—Richard K. Seidel
Attorney, Agent, or Firm—Wenderoth, Lind & Ponack

[57] ABSTRACT

An artificial bait device or lure wherein a weight is longitudinally movably received in a main body thereof and a holding device for positively holding the weight at the central portion or forward portion of the main body is provided, whereby, when the lure is thrown, the weight is released by the holding device owing to the inertia thereof, so that the main body flies, with the weight shifted rearwardly toward the tail for holding the posture of the tail end thereof directed in the flying direction. When the lure lands on the water, the weight moves forwardly in the main body and is held by the holding device provided at the central portion or forward portion of the main body. The forwardly moved weight enhances the swimming action when the lure is drawn through the water.

1 Claim, 2 Drawing Sheets

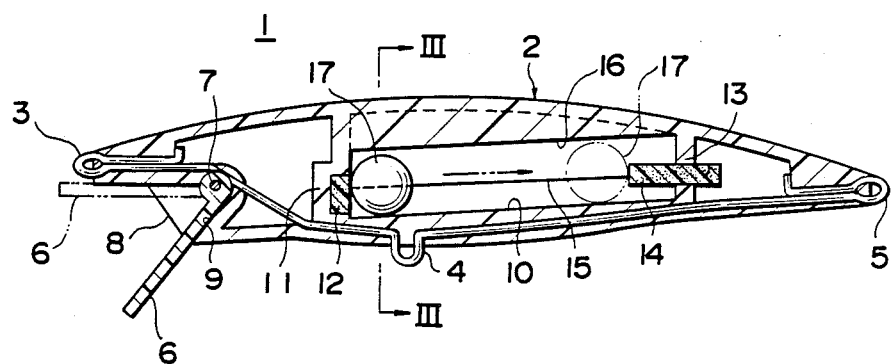
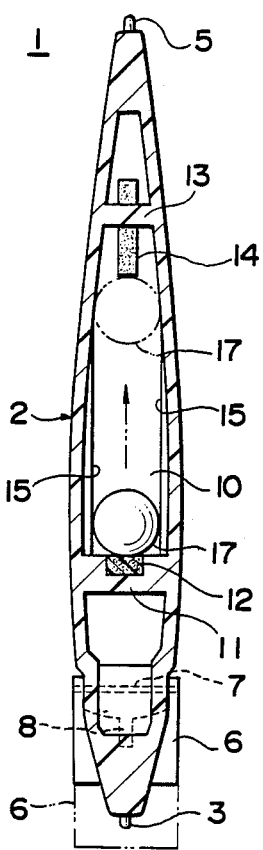
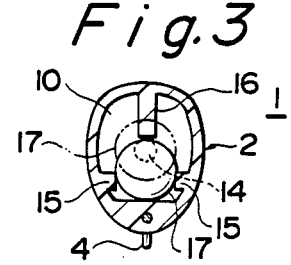
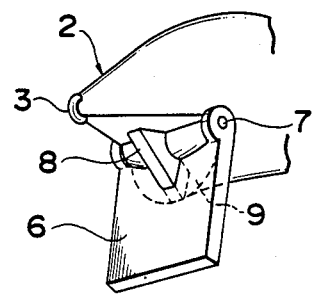

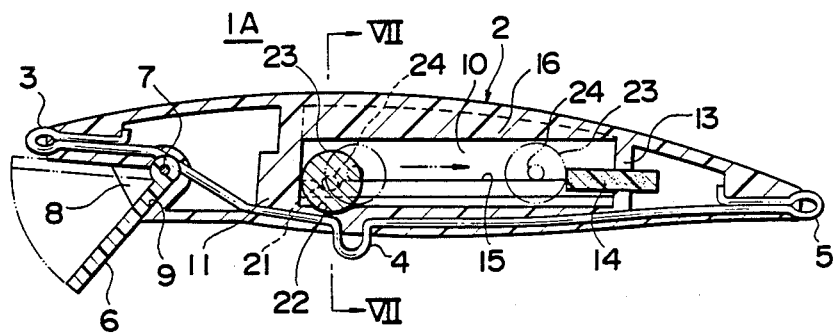
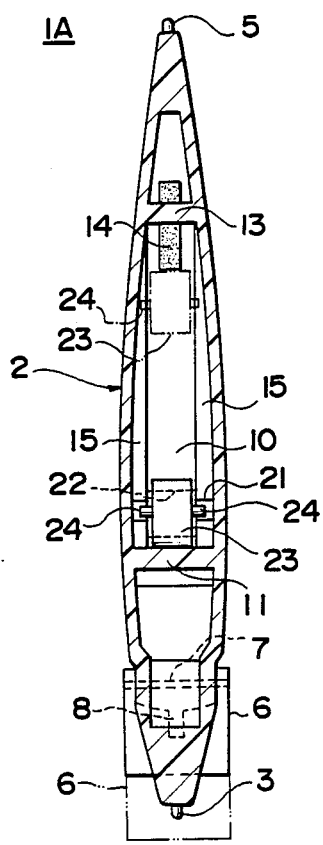
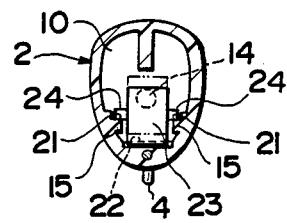

4,761,910

ARTIFICIAL BAIT DEVICE

BACKGROUND OF THE INVENTION

1. Field of the Invention

This invention relates to an artificial bait device, and more particularly to one effectively used as a fish-shaped artificial bait device commonly referred to as a lure (hereinafter referred to as a "lure").

2. Description of the Prior Art

With a conventional lure, in order to improve the result of angling by making the lure wave its tail, the center of gravity has been set in the central portion or in the forward portion in the longitudinal direction of a main body of the lure.

However, in the lure of the type described, given that the center of gravity is set in the central portion or the forward portion of the main body thereof, when the lure is thrown, the main body is turned to destabilize the posture of the lure, thus disadvantageously resulting in decreased and/or irregular flying ranges.

SUMMARY OF THE INVENTION

The present invention has as its object the provision of a lure capable of increased flying range without hampering with swimming function.

To this end, the present invention contemplates in that, in the main body of the artificial bait device, a weight is housed in a manner to be movable in the longitudinal direction, and holding means capable of holding the weight is provided.

By use of the above-described holding means, when the lure is thrown, the weight, being released by inertia from being held moves to the rear portion of the main body, whereby the main body flies with its tail being directed in the flying direction. As a result, the flying posture is constantly stabilized, so that the flying range is increased and substantially even each time.

When the lure lands on the water, the weight moves toward the head of the main body owing to the inertia to be held by the holding means, whereby the center of gravity moves to the central portion or the forward portion of the main body. As a result, as the lure is drawn near by a user, the lure waves its tail, thus improving the result of angling.

BRIEF DESCRIPTION OF THE DRAWINGS

FIG. 1 is a sectional side view showing a first embodiment of the lure according to the present invention;

FIG. 2 is a sectional plan view of the first embodiment of the lure;

FIG. 3 is a sectional front view taken along the line III—III in FIG. 1;

FIG. 4 is a partial perspective view of the first embodiment of the lure;

FIG. 5 is a sectional side view showing another embodiment of the present invention;

FIG. 6 is a sectional plan view of the second embodiment of FIG. 5; and

FIG. 7 is a sectional front view taken along the line VII—VII in FIG. 5.

DETAILED DESCRIPTION OF THE PREFERRED EMBODIMENTS

In this embodiment, this lure 1 has a main body 2, which is substantially bisymmetrical and streamlined so that the outer shape thereof resembles a fish. The main body 2 is constructed such that a pair of longitudinally divided right and left pieces are formed from synthetic resin or the like, respectively, and thereafter, both pieces are integrated by a suitable method such as bonding or welding, with both pieces being put together back to back. The head top of the main body 2 is projectingly provided thereon with a fishing line fastening portion 3 being of substantially a ring shape so that a fishing line, not shown, may be fastened thereto. The main body 2 of lure 1 is projectingly provided at the undersurface and the tail end thereof with fish-hook engaging portions 4 and 5 each being of substantially a ring shape so that a fish-hook, not shown, may be engaged therewith. The fishing line fastening portion 3 and fish-hook engaging portions 4 and 5 are each formed such that a single steel wire is embedded in the main body 2 and bent in a shape.

In the forward portion of the main body 2, a resistance plate 6 being of substantially rectangular shape is rotatably supported at the rear end edge thereof by a pin 7 journalled in the lateral direction, in a manner to be openable or closable in the vertical direction. The resistance plate 6 can be slidably coupled at the central portion in the lateral direction thereof onto a rolling preventive plate 8 projecting in the vertical direction, so that rolling can be avoided. A stopper 9 formed at a position subsequent to the resistance plate 6 of the main body 2 engages the resistance plate 6, to thereby define the limit of rearward rotation of the resistance plate 6. Owing to this defining, the resistance plate 6 can maintain a forward declination at a predetermined angle.

A hollow portion 10 is formed through the main body 2 over substantially the total length thereof and completely sealed. In the hollow portion 10, a mounting portion 11 is disposed at a predetermined position slightly more forward than the center of the hollow portion 10 and integrally formed on the main body 2. A magnet 12 as holding means is embedded in this mounting portion 11 in such a manner that the rear end face thereof is exposed. A bulkhead-shaped stopper 13 is provided at the rear end of the hollow portion 10 substantially perpendicularly to the hollow portion 10 and integrally formed on the main body 2. Solidly secured to the stopper 13 extending in the longitudinal direction is a round rod-like shock absorbing member 14 formed of an elastic material such as rubber.

The hollow portion 10 is raisedly formed on opposing inner surfaces thereof with side surface rails 15. Further, the hollow portion 10 is raisedly formed substantially on the center line of a ceiling thereof with a ceiling surface rail 16 substantially over the total length of the ceiling. These rails 15 and 16 are integrally formed on the main body 2 in parallel to one another, and receive therebetween a steel ball 17 as a weight, which is turningly movable in the longitudinal direction.

Action of this embodiment will hereunder be described.

The lure 1 of the arrangement described is fastened to the fishing line fastening portion 3 thereof with a fishing line, and secured to a fishing rod, not shown. When the fishing rod is forcibly swung to throw the lure 1, the steel ball 17, which has been attracted by the magnet 12, is released from the holding force owing to the impact received then, moves towards the tail end of the main body 2, i.e. forwards in the flying direction along the rails 15 and 16 under the inertia due to its gravity, comes into contact with the shock absorbing member 14, and stays there while the lure 1 flies.

While flying as described above, the main body 2 stably maintains a desired proper flying posture in the flying direction without turning because the steel ball 17 is positioned at the tail end of the main body 2, thus resulting in an increased and uniform flying range each time. More specifically, the above fact is governed by the same principle that, when the forward end is shaken, a flying object such as an arrow of a bow and arrow has a considerably decreased flying range and different flying range each time, whereas, when the forward end is stabilized, the flying object has a stabilized flying range.

Here, moving to the rear, the steel ball 17 smoothly moves without rolling and pitching, because the steel ball 17 is guided by the rails 15 and 16, so that stabilized flying is not impeded. Furthermore, when the steel ball 17 stops, the impact is relieved by the shock absorbing member 14, so that stabilized flying is not impeded.

The resistance plate 6 receives air resistance at the rear surface thereof during flying, and the resistance plate 6 turns upwardly to be closed horizontally, so that the resistance plate 6 is not impeded in its stabilized flying.

When the lure 1 lands on the water, the steel ball 17 turningly moves from the tail end to the head of the lure 1 under the inertia, attracted by the magnet 12, and is held in this position.

Subsequently, when the lure 1 is begun to be drawn near, the resistance plate 6, receiving water resistance at the front thereof, turns in the opening direction and is regulated in its posture by the stopper 9. When the resistance plate 6 is opened, as the lure 1 is drawn near, the water resistance strongly acts on the resistance plate 6, whereby the lure 1 comes into a state where the lure 1 swims like a fish, waving its tail. At this time, the steel ball 17 is held at a predetermined position preset by the magnet 12, whereby the lure 1 performs a desirable movement preset by the position of its center of gravity.

The following advantages can be achieved by the above embodiment.

(1) The flying range of the lure can be extended, so that the result of angling can be increased to a considerable extent. More specifically, when the flying range is doubled, an area in which the lure can be drawn becomes quadrupled, so that the probability of angling sucess can be increased accordingly.

In passing, when the lure in the above embodiment was compared in flying range with the conventional lure on the same condition, the flying range was increased by 30% when there was no wind, and doubled when there was adverse wind.

(2) The swimming state during drawing of the lure can be maintained satisfactorily, so that decreased result of angling owing to improper swimming state can be avoided.

(3) The resistance plate is rotatably supported, whereby the resistance plate is closed to control air resistance during flying, so that stabilized flying can be maintained.

FIGS. 5 to 7 shown another embodiment of the present invention.

In this embodiment, a pair of engageable grooves 21 are recessedly formed on the top surfaces of the side surface rails 15 of a lure 1A at predetermined positions close to the mounting portion 11, each having a suitable depth. The hollow portion 10 is recessedly formed at the bottom surface thereof and at a position corresponding to the engageable grooves 21 with an engageable recess 22. On the other hand, a columnar body 23 formed of rigid lead as a weight is longitudinally, turningly movably received between the rails of the hollow portion 10, and the columnar body 23 is projectingly and concentrically provided at opposite side surfaces thereof with a pair of shafts 24. Then, the columnar body 23 is adapted to be coupled with the engageable recess 22, and the shafts 24 are adapted to be coupled with the engageable grooves 21.

In this embodiment, when the lure 1A is thrown, the columnar body 23 moves to the tail end of the main body 2, so that the lure 1A flies stably to increase the flying range.

When the lure 1A is landed on the water, the columnar body 23 turningly moves from the tail end to the head, whereby the circumferential surface of the columnar body 23 is coupled with the engageable recess 22 and the shafts 24 are coupled with the engageable grooves 21, respectively. By these couplings, the columnar body 23 is held at a predetermined position of the main body 2, so that the lure 1A can be drawn near in the preset swimming state.

In this embodiment, lead is used as the weight and the engageable portions engageable with parts of the weight are used as the holding means instead of the magnet, whereby the ratio of the weight to the total weight of the lure in weight can be increased, so that the efficiency of the shifting of the center of gravity moving can be improved.

Needless to say the present invention need not necessarily be limited to the above embodiments, and various modifications may be adopted within the scope of not departing from the gist of the invention.

For example, the main body need not necessarily be limited to be formed into a fish shape, and may be formed into any of other shapes having the effect of working as a false bait.

As has been described hereinabove, according to the present invention, the flying range can be increased without hampering the swimming function, so that the result of angling can be improved.

What is claimed is:

1. An artificial bait device comprising:
   a main body;
   a steel ball received within said main body and longitudinally movable therein; and
   a magnet attached to said main body for attracting and releasably holding said steel ball.

* * * * *